United States Patent
Halahmi et al.

(10) Patent No.: US 7,120,661 B2
(45) Date of Patent: Oct. 10, 2006

(54) BIT EXACTNESS SUPPORT IN DUAL-MAC ARCHITECTURE

(75) Inventors: Dror Halahmi, Herzelia (IL); Yoram Salant, Herzelia (IL)

(73) Assignee: Freescale Semiconductor, Inc., Austin, TX (US)

( * ) Notice: Subject to any disclaimer, the term of this patent is extended or adjusted under 35 U.S.C. 154(b) by 670 days.

(21) Appl. No.: 10/447,352

(22) Filed: May 29, 2003

(65) Prior Publication Data
US 2003/0229659 A1  Dec. 11, 2003

(30) Foreign Application Priority Data
Jun. 8, 2002  (GB) ................ 0213177.9

(51) Int. Cl.
*G06F 7/499* (2006.01)

(52) U.S. Cl. ................ 708/553; 708/498

(58) Field of Classification Search ........ None
See application file for complete search history.

(56) References Cited

U.S. PATENT DOCUMENTS

| | | | |
|---|---|---|---|
| 5,319,588 A | * | 6/1994 | Haines et al. ........ 708/552 |
| 5,889,689 A | * | 3/1999 | Alidina et al. ........ 708/552 |
| 6,182,105 B1 | * | 1/2001 | Kolagotla et al. ........ 708/552 |
| 2005/0027774 A1 | * | 2/2005 | Chauvel et al. ........ 708/552 |

FOREIGN PATENT DOCUMENTS

EP  1058185 A1  12/2000

OTHER PUBLICATIONS

GB 0213177.9 Search Report.

* cited by examiner

Primary Examiner—D. H. Malzahn

(57) ABSTRACT

An arrangement (200) and method for bit exactness support in dual-MAC architecture by detecting when underflow or overflow conditions will occur, and for operating the dual-MAC arrangement in single-MAC mode for at least one cycle upon such detection.

This produces the advantages of providing dual-MAC execution with saturation capabilities, with only a small degradation in performance, while employing detection logic that is very small and simple compared to the logic required for a conventional full saturation dual-MAC architecture.

19 Claims, 2 Drawing Sheets

BIT EXACTNESS SUPPORT IN DUAL-MAC ARCHITECTURE

FIELD OF THE INVENTION

This invention is applicable to the field of DSPs (Digital Signal Processors) which run bit exact applications. Such applications are, for example, common in vocoders for use in GSM (General System for Mobile Communications) systems such as EFR (Enhanced Full Rate) vocoders, FR (Full Rate) vocoders, HR (Half Rate) vocoders, AMR (Adaptive Multi-Rate) vocoders, and G729 (complying with International Telecommunications Union standard 'G729') vocoders, etc.

BACKGROUND OF THE INVENTION

The major and most common task in executing DSP algorithms is data processing in MAC (multiply-accumulate) loops. The majority of these MAC loops are within FIR (Finite Impulse Response) type algorithms. Many high-end DSP's are expected to use a dual-MAC structure to double their processing performance in the MAC loops. It is known that many applications require bit exactness. It also known that adding saturation logic for supporting bit exactness in dual-MAC is very expensive in area, timing critical path, and in power consumption.

Saturation arithmetic in a DSP is known, for example, from U.S. Pat. No. 3,812,470. This ubiquitous feature allows arithmetic combinations of values to saturate to a maximum value when signals become excessively strong (saturation in a DSP mimics the behavior of analog amplifiers, which are said to "rail out" at a maximum signal level; without saturation arithmetic in a DSP overflowing sums would 'wrap around'—as only binary numbers—and produce unpredictable and undesirable outputs). In regular arithmetic, when an operation overflows or underflows (the result exceeds a maximum number of bits), the most significant bit is usually truncated (a process called 'wrap-around') and the remaining bits are used to produce the result, which may thus be significantly different from the value represented by the maximum number of bits (the 'saturation' value). Saturation arithmetic avoids this effect: instead of 'wrapping around' the result becomes the 'saturation' value. Saturation arithmetic is applicable in any area where a closest representable value in a result is preferable to a 'wrap-around' result.

However, although the additional hardware required for implementing a single-MAC with saturation capabilities may be considered acceptable, the additional hardware which is required for fully implementing a bit exact dual-MAC with saturation capabilities is significant and will impact timing critical path, chip area and power consumption. Although most new high-end DSP's have one or more dual-MAC units, it is expected that these will not support full dual-MAC bit exactness saturation capabilities. Avoidance of the high cost of support for full dual-MAC bit exactness saturation capabilities is a significant incentive to dropping this feature. The additional hardware requirements for implementing single-MAC and dual-MAC solutions with saturation capabilities are known, for example, from the paper by Yadav, Schulte and Glossner, titled "Parallel Saturating Fractional Arithmetic Units", published in *Proceedings of the 9th Great Lakes Symposium on VLSI*, pp. 172–179, Ann Arbor, Mich., Mar. 4–6, 1999.

A need therefore exists for bit exactness support in dual-MAC architecture wherein the abovementioned disadvantage(s) may be alleviated.

STATEMENT OF INVENTION

In accordance with a first aspect of the present invention there is provided an arrangement for bit exactness support in dual-MAC architecture, comprising:
 a dual-MAC arrangement for performing multiply-accumulate arithmetic operations on digital values A, B, C, D and E to produce a result E=<E+<C*D>+<A*B>>, where '+' represents addition, '*' represents multiplication, and '<>' represents saturation; and
 a detector and enabler for detecting when an underflow or overflow condition will occur from adding C*D, and for enabling the dual-MAC arrangement to operate in single-MAC mode for at least a cycle upon such detection.

In accordance with a second aspect of the present invention there is provided a method for bit exactness support in dual-MAC architecture, the method comprising:
 providing a dual-MAC arrangement performing multiply-accumulate arithmetic operations on digital values A, B, C, D and E to produce a result E=<E+<C*D>+<A*B>>, where '+' represents represents addition, '*' represents multiplication, and '<>' represents saturation; and
 detecting when an underflow or overflow condition will occur from adding C*D, and enabling the dual-MAC arrangement to operate in single-MAC mode for at least a cycle upon such detection.

The invention provides, at least in a preferred embodiment, a simple detection logic scheme that eliminates the need of the large circuitry for supporting bit exactness, but provides almost full dual-MAC with saturation capabilities.

BRIEF DESCRIPTION OF THE DRAWINGS

One arrangement and method for bit exactness support in dual-MAC architecture incorporating the present invention will now be described, by way of example only, with reference to the accompanying drawing(s), in which.

DESCRIPTION OF PREFERRED EMBODIMENT

The major and most common task in executing DSP algorithms is data processing in MAC (multiply-accumulate) loops. The majority of these MAC loops are within FIR (Finite Impulse Response) type algorithms. It is known that many applications require bit exactness, with saturation capabilities.

Figure 1:
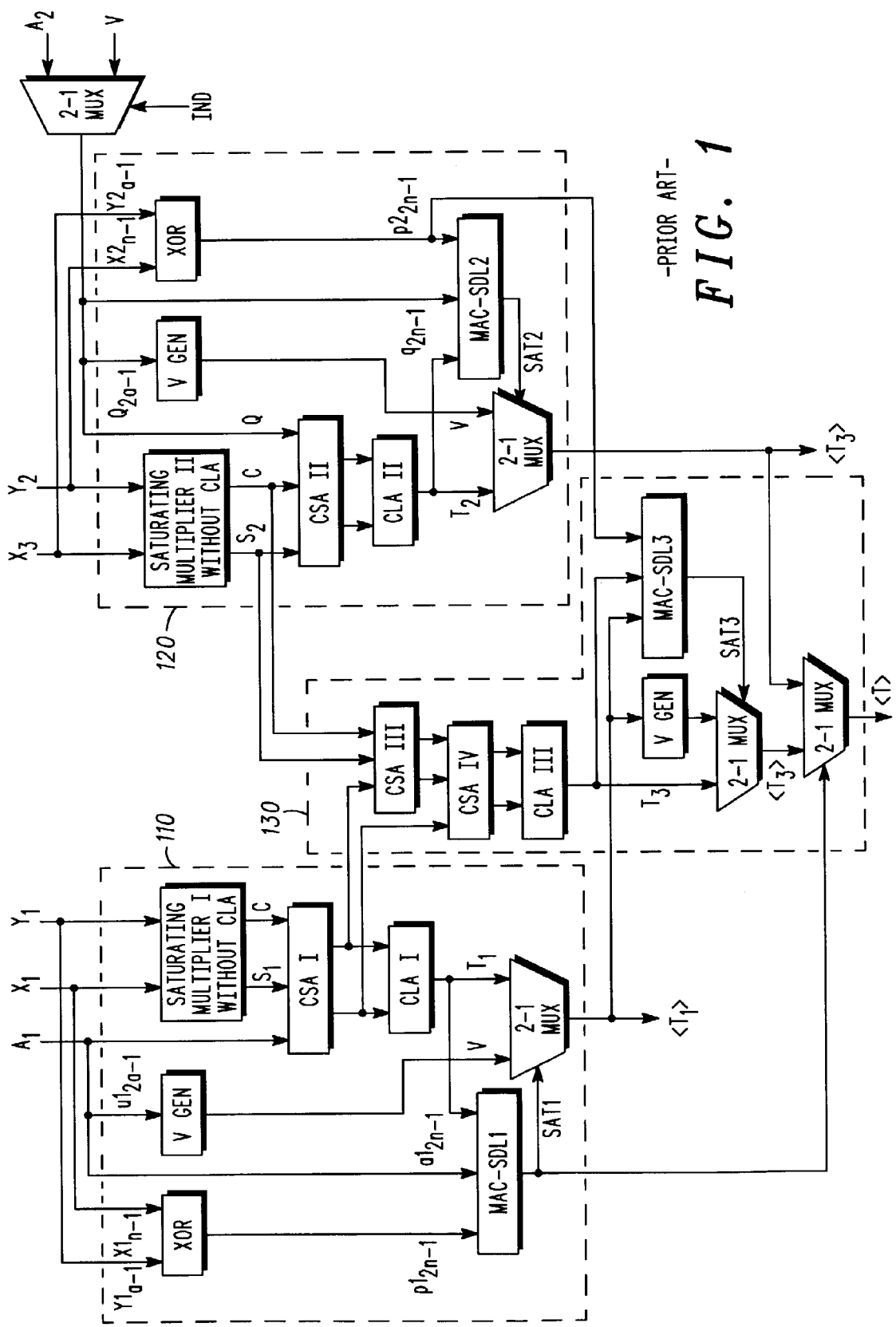
FIG. 1 shows a block schematic illustration of a prior art dual-MAC architecture with full saturation capabilities.

Referring firstly to FIG. 1, a dual-MAC arrangement 100 with full saturation capabilities includes two single-MAC arrangements 110 and 120, each with full saturating capabilities. The dual-MAC arrangement 100 also includes additional hardware 130.

Saturation mode is used in bit exact applications. This mode assumes a lower common denominator type of fixed point DSP type without integer guard bits. All intermediate arithmetic results are saturated.

In the following description, the notation <X> is used for the saturated value of X result of 32 bits. The value of <X> is determined by the following saturation rule:

| if X < −1 | | |
|---|---|---|
| | <X> = −$1.00000000 | (hexadecimal 32-bit two's complement $80000000, i.e., underflow saturation condition for X) |
| if X >= 1 | | |
| | <X> = +$0.fffffffe | (hexadecimal 32-bit two's complement $7fffffff, i.e., overflow saturation condition for X) |
| else | | |
| | <X> = X. | |

The saturation requirements impose a strict order of MAC's operations since at each iteration a saturation may occur.

A single MAC saturating of MAC A, B, C should calculate $$C=<C+<A*B>>$$

where A*B is saturated if both A and B equal −1.

C+<A*B> is saturated according to the above saturation rule.

A dual MAC saturating of MAC A, B, C, D, E should calculate $$E=<E+<C*D>+<A*B>>$$

where A*B and C*D are independently saturated if both A and B or both C and D equal −1.

E+<C*D>+<A*B> is saturated according to the above saturation rule.

Since the order of accumulation should be maintained there is a danger that E+A*B may be saturated (in a single MAC). The dual-MAC should support the following:

| (i) | <E × C * D + A * B> | (if no intermediate saturation occurs) |
|---|---|---|
| (ii) | <E + C * D + $7fffffff> | (A * B saturated) |
| (iii) | <E + $7fffffff + A * B> | (C * D saturated) |
| (iv) | <$7fffffff + C * D> | (E + A * B saturated - positive constant) |
| (v) | <$80000000 + C * D> | (E + A * B saturated - negative constant) |

(iv) and (v) are the problematic cases. This means that intermediate results should be calculated for E+A*B and saturation should be performed on these intermediate results if required.

These cases are analysed in the paper by Yadav, Shulte and Glossner referenced above.

It will be understood that in the dual-MAC arrangement 100 of FIG. 1, a significant amount of additional logic is required to support fully saturated operation (compared to a simple saturating dual-MAC (working in single-MAC mode). For example, a simple saturating dual-MAC requires only a single CLA. This amount of logic occupies a large area of integrated circuit silicon, so significantly increasing the DSP integrated circuit cost. The large amount of logic is required for calculating <E+A*B> (as discussed above) to find if a saturation condition occurred, and also for calculating option (i), (iv) and (v) in parallel and then selecting their result according to <E+A*B>. All calculations are done in parallel to reduce critical path problems.

Improvement

Figure 2:
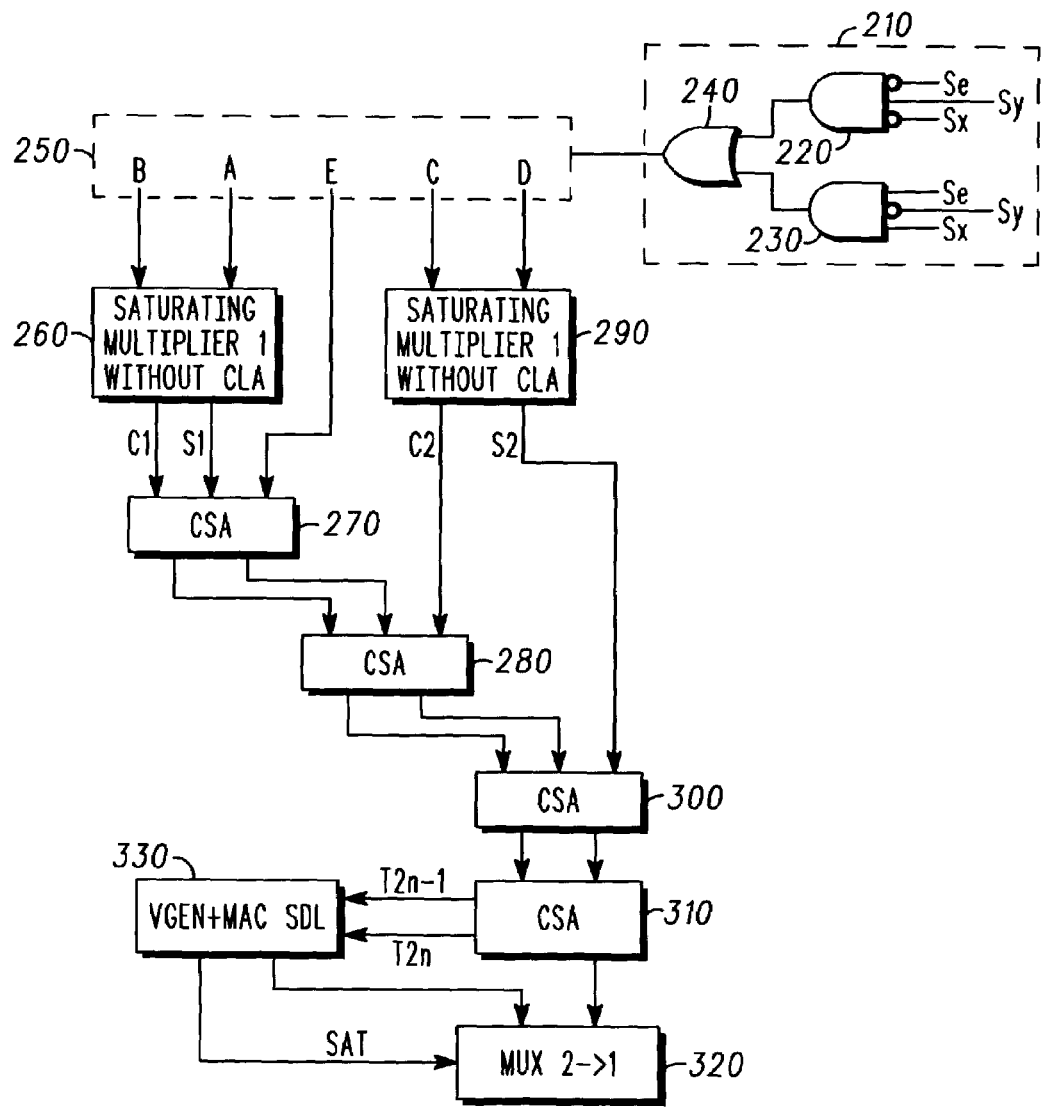
FIG. 2 shows an illustration of a dual-MAC architecture with saturation capabilities in accordance with a preferred embodiment of the present invention.

Referring now to FIG. 2, as will be explained in further detail below, the amount of additional logic can be significantly reduced (with relatively small performance degradation) by using simple detection logic that will detect cases (iv) and (v) and upon detection will signal to the dual-MAC to operate in a single-MAC mode. This enables a simple implementation of a saturating dual-MAC.

The following description considers the optional cases (iv) and (v) of the dual-MACs according to operand sign. Assuming:

New $E=E+Y+X$ where X=A*B, and Y=C*D.

Also assuming that the correct order is first add X and then add Y.

Since the signs of A, B, C, D and E are known in advance, thus X and Y signs are known in advance too. Now defining Sx, Sy and Se as the signs of X, Y and E respectively, the various cases break down as follows:

| Case | Sx | Sy | Se | Problem |
|---|---|---|---|---|
| 1 | + | + | + | No |
| 2 | + | + | − | No |
| 3 | + | − | + | Yes |
| 4 | + | − | − | No |
| 5 | − | + | + | No |
| 6 | − | + | − | Yes |
| 7 | − | − | + | No |
| 8 | − | − | − | No |

Cases 1, 2, 7 and 8 are not problematic since Sx and Sy are the same, thus if saturation occurs, it should occur anyway.

Cases 4 and 5 are more complicated but they are also non-problematic. In both cases, after the addition of X to E, saturation is impossible because Sx and Se are different. Thus saturation may occur only after the addition of Y. Therefore, if saturation occurs it should occur in both single-MAC and dual-MAC modes, and if it doesn't, there should be no saturation in both cases.

So only two cases out of eight may cause a problem. In order to cope with this problem, when the cases 3 and 6 (problematic) are detected then an additional cycle (stall) is injected and the dual-MAC machine will work as single-MAC machine for 2 cycles. By pre-detecting these cases, and adding X and Y one by one, bit exactness is maintained.

As shown in FIG. 2, a novel dual-MAC arrangement 200 with bit exactness support has a logic arrangement 210 having AND gates 220 and 230 and an OR gate 240. The AND gate 220 receives at its inputs (i) a signal representative of the inverted sign (Se) of the value E, (ii) a signal representative of a sign Sy, and (iii) a signal representative of an inverted sign Sx. The AND gate 230 receives at its inputs (i) a signal representative of the sign (Se) of the value E, (ii) a signal representative of the sign Sy, and (iii) a signal representative of the sign Sx. The outputs of the AND gates 220 and 230 are coupled to inputs of the OR gate 240.

The output of the OR gate 240 is coupled to an input trigger 250, which triggers input of A, B, C, D and E values to subsequent circuitry as follows. A saturating multiplier without carry-look-ahead 260 receives the values A and B, and produces outputs C1 and S1. A carry-save-adder 270 is coupled to receive the C1 and S1 ouputs from the multiplier 260 and the value E. A carry-save-adder 280 is coupled to receive outputs from the carry-save-adder 270. A saturating multiplier without carry-look-ahead 290 receives the values C and D, and produces outputs C2 and S2. The carry-save-adder 280 is coupled to receive the C2 ouput from the multiplier 290 and the value E. A carry-save-adder 300 is coupled to receive outputs from the carry-save-adder 280 and the S2 output from the muliplier 290. A carry look-ahead adder 310 is coupled to receive outputs from the carry-save-adder 300 and to produce an output which is applied to a 2-1 multiplexer 320. The carry look-ahead adder 310 also produces outputs T2$n$-1 and T2$n$, which are applied to saturated value generator (VGen) and MAC saturation detection logic (SDL) circuitry, shown collectively at 330, which produces (i) a saturated value output V coupled to an input of the multiplexer 320, and (ii) a saturation detection output Sat which is coupled to the multiplexer 320. It will be understood that the signal T2$n$-1 is bit 31 of the 0–31 bit output value of the CLA 300, and that the signal and T2$n$ is a 'guard bit' (bit 32 of the 0–32 bit value produced in the CLA 330). It will be understood that the MAC saturation detection logic can easily detect saturation, in known manner, by sensing if the values of T2$n$-1 and T2$n$ are different. It will be understood that the blocks 260–330 are the same as the similarly-labelled blocks in prior art FIG. 1, and need not be described in further detail.

It will be understood that the novel dual-MAC arrangement 200 can function either in dual-MAC mode (with input values applied to the saturating multipliers 260 and 290) or in single-MAC mode (with one of the inputs C and D forced to '0', thus forcing the output of the multiplier 290 to '0' and effectively allowing only the multiplier 260 to operate meaningfully).

In operation, it will be understood that logic 210 arrangement effects input pipeline control, based on the signs Sx, Sy and Se, the sign value Sx being given by an exclusive-OR of the most significant bits of values A and B (i.e., Sx=msb (A) XOR msb(B)), and the sign value Sy being given by an exclusive-OR of the most significant bits of values C and D (i.e., Sy=msb(C) XOR msb(D)). When the appropriate condition for an underflow or overflow to occur from adding C*D (as determined by the AND gates 220 and 230 and the OR gate 240 of the logic arrangement 210) is not met, the logic arrangement 210 applies all values A, B, C, D and E at the same time to the subsequent components 260–330 in FIG. 2 and the arrangement 200 operates in dual-MAC mode.

However, when the logic arrangement 210 determines (via the AND gates 220 and 230 and the OR gate 240) that the signs of A*B and E are the same and the sign of C*D is different to that of A*B and E, the output of the logic arrangement 210 serves to control the input trigger 250 to cause the arrangement to operate in single-MAC mode, as follows:

in a first cycle, the values A, B and E are input to the multiplier 260 and a '0' is substituted on one of the inputs C and D, forcing the output of the multiplier 290 to '0';
in a second cycle, the 'old' C and D values are applied to the inputs of the multiplier 260, and the 'new E' value (new E=E+A*B) is input to the E port (a '0' again being substituted on one of the inputs C and D, forcing the output of the multiplier 290 to '0').

It will be appreciated (by comparing the novel saturating dual-MAC confuration of FIG. 2 with the prior art saturating dual-MAC confuration of FIG. 1) that the novel saturating dual-MAC arrangement 200 of FIG. 2 requires less additional logic as follows:

only one CLA (carry with look-ahead adder) unit and only one SDL (saturation detection logic) unit is used in the arrangement 200, dispensing with CLA I, CLA II, SDL 1 and SDL 2 in FIG. 1;

only one multiplexer is required at the final stage where the data or the saturation constant are selected; and 3 CSA (carry saturating adder units) are used in the arrangement 200, compared to four CSA units in the configuration of FIG. 1.

It will also be appreciated that the scheme described above could be extended by taking additional MSB's (most significant bits) from source operands for predicting saturation occurrence (especially if the data is normally distributed around zero value).

It will be understood that the novel scheme for bit exactness support in dual-MAC architecture will typically be implemented in an integrated circuit DSP, and may find particular use in vocoder applications for wireless communications.

It will be understood that the scheme described above for bit exactness support in dual-MAC architecture provides the advantages that it provides dual-MAC execution with saturation capabilities at a penalty of only 25% degradation in performance, while employing detection logic that is very small and simple compared to the logic required for a full saturation dual-MAC architecture.

The invention claimed is:

1. An arrangement for bit exactness support in dual-MAC architecture, comprising:

a dual-MAC arrangement for performing multiply-accumulate arithmetic operations on digital values A, B, C, D and E to produce a result E=<E+<C*D>+<A*B>>, where '+' represents addition, '*' represents multiplication, and '<>' represents saturation; and a detector and enabler for detecting when an underflow or overflow condition will occur from adding C*D, and for enabling the dual-MAC arrangement to operate in single-MAC mode for at least a cycle upon such detection.

2. The arrangement of claim 1 wherein the detector is arranged to detect when the signs of A*B and E are the same and the sign of C*D is different to that of A*B and E, and for enabling the dual-MAC arrangement to operate in single-MAC mode for at least 2 cycles upon such detection.

3. The arrangement of claim 1 wherein the means for detecting comprises an evaluator for evaluating most significant bits from source operands for predicting saturation occurrence.

4. The arrangement of claim 1 wherein the dual-MAC arrangement comprises:

a first saturating multiplier without carry look-ahead arranged for multiplying values A and B;

a second saturating multiplier without carry look-ahead arranged for multiplying values C and D;

a first carry saturating adder coupled to receive the value E and outputs from the first saturating multiplier;

a second carry saturating adder coupled to receive a first output from the second saturating multiplier and outputs from the first carry saturating adder;

a third carry saturating adder coupled to receive a second output from the second saturating multiplier and outputs from the second carry saturating adder;

a carry look-ahead adder coupled to receive outputs from the third carry saturating adder;

a saturation detector coupled to the carry look-ahead adder for producing a saturation value; and a multiplexer coupled to the carry look-ahead adder and the saturation detector for selecting an output therefrom.

5. The arrangement of claim 4 wherein the detector and enabler comprises logic circuitry for detecting when an underflow or overflow condition will occur from adding C*D and an input control for applying the values A and B to the first saturating multiplier, and for subsequently applying the values C and D to the second saturating multiplier.

6. The arrangement of claim 5 wherein the logic circuitry comprises:

first AND logic for receiving a signal representative of the inverted sign of the value E, a signal representative of a logical exclusive-OR combination of the most significant bits of the values A and B, and a signal representative of the inverted logical exclusive-OR combination of the most significant bits of the values C and D, and for producing a logical AND combination thereof as an output;

second AND logic for receiving a signal representative of the sign of the value E, a signal representative of the inverted logical exclusive-OR combination of the most significant bits of the values A and B, and a signal representative of a logical exclusive-OR combination of the most significant bits of the values C and D, and for producing a logical AND combination thereof as an output;

OR logic for receiving the outputs of the first and second AND logic and for producing a logical OR combination thereof.

7. The arrangement of claim 1 comprised in a digital signal processor.

8. The arrangement of claim 1 wherein the wherein the arrangement is comprised in an integrated circuit.

9. A method for bit exactness support in dual-MAC architecture, the method comprising:

providing a dual-MAC arrangement performing multiply-accumulate arithmetic operations on digital values A, B, C, D and E to produce a result E=<E+<C*D>+<A*B>>, where '+' represents represents addition, '*' represents multiplication, and '<>' represents saturation; and detecting when an underflow or overflow condition will occur from adding C*D, and enabling the dual-MAC arrangement to operate in single-MAC mode for at least a cycle upon such detection.

10. The method of claim 9 wherein the detecting means detects when the signs of A*B and E are the same and the sign of C*D is different to that of A*B and E, and enables the dual-MAC arrangement to operate in single-MAC mode for at least 2 cycles upon such detection.

11. The method of claim 9 wherein the step of detecting comprises evaluating most significant bits from source operands for predicting saturation occurrence.

12. The method of claim 9 wherein the dual-MAC arrangement comprises:

a first saturating multiplier without carry look-ahead multiplying values A and B;

a second saturating multiplier without carry look-ahead multiplying values C and D;

a first carry saturating adder receiving the value E and outputs from the first saturating multiplier;

a second carry saturating adder receiving a first output from the second saturating multiplier and outputs from the first carry saturating adder;

a third carry saturating adder receiving a second output from the second saturating multiplier and outputs from the second carry saturating adder;

a carry look-ahead adder receiving outputs from the third carry saturating adder;

a saturation detector coupled to the carry look-ahead adder for producing a saturation value; and a multiplexer coupled to the carry look-ahead adder and the saturation detector and selecting an output therefrom.

13. The method of claim 12 wherein the step of detecting and enabling comprises providing logic circuitry for detecting when an underflow or overflow condition will occur from adding C*D and input control means applying the values A and B to the first saturating multiplier means, and subsequently applying to the second saturating multiplier means the values C and D.

14. The method of claim 13 wherein the logic circuitry comprises:

first AND logic receiving a signal representative of the inverted sign of the value E, a signal representative of a logical exclusive-OR combination of the most significant bits of the values A and B, and a signal representative of the inverted logical exclusive-OR combination of the most significant bits of the values C and D, and producing a logical AND combination thereof as an output;

second AND logic receiving a signal representative of the sign of the value E, a signal representative of the inverted logical exclusive-OR combination of the most significant bits of the values A and B, and a signal representative of a logical exclusive-OR combination of the most significant bits of the values C and D, and producing a logical AND combination thereof as an output;

OR logic receiving the outputs of the first and second AND logic and producing a logical OR combination thereof.

15. The method of claim 9 performed in a digital signal processor.

16. The method of claim 9 performed in an integrated circuit.

17. The method of claim 9 performed in a bit exact application.

18. The method of claim 9 performed in a vocoder.

19. The method of claim 9 performed in a wireless communication system.

* * * * *